US008688404B1

(12) United States Patent
Levy

(10) Patent No.: US 8,688,404 B1
(45) Date of Patent: Apr. 1, 2014

(54) METHOD AND APPARATUS OF COMMON TIME-STAMPING

(75) Inventor: Eli Levy, Petah Tikva (IL)

(73) Assignee: Marvell International Ltd., Hamilton (BM)

( * ) Notice: Subject to any disclaimer, the term of this patent is extended or adjusted under 35 U.S.C. 154(b) by 570 days.

(21) Appl. No.: 12/822,574

(22) Filed: Jun. 24, 2010

Related U.S. Application Data

(60) Provisional application No. 61/223,323, filed on Jul. 6, 2009.

(51) Int. Cl.
*G06F 17/40* (2006.01)
*G01R 31/28* (2006.01)
*G06F 11/00* (2006.01)
*H04L 7/00* (2006.01)

(52) U.S. Cl.
USPC ............ 702/187; 714/731; 714/744; 375/354

(58) Field of Classification Search
USPC .................................. 702/187; 714/731, 744
See application file for complete search history.

(56) References Cited

U.S. PATENT DOCUMENTS

| 2005/0262372 A1* | 11/2005 | Saitoh | 713/400 |
| 2006/0288053 A1* | 12/2006 | Holt et al. | 707/203 |
| 2007/0183461 A1* | 8/2007 | Eyal et al. | 370/503 |
| 2009/0092154 A1* | 4/2009 | Malik et al. | 370/480 |

* cited by examiner

*Primary Examiner* — John E Breene
*Assistant Examiner* — Manuel Rivera Vargas

(57) ABSTRACT

Aspects of the disclosure provide an apparatus for enabling common time-stamping. The apparatus includes a first subsystem having a first timer and a second subsystem having a second timer of a same frequency as the first timer. The first subsystem is configured to time-stamp first events based on the first timer. The second subsystem is configured to time-stamp second events based on the second timer. The apparatus further includes a synchronization module configured to take a first snapshot of the first timer and take a second snapshot of the second timer. Then, based on a difference between the first snapshot and the second snapshot, the first events and the second events are commonly time-stamped.

20 Claims, 5 Drawing Sheets

METHOD AND APPARATUS OF COMMON TIME-STAMPING

INCORPORATION BY REFERENCE

This application claims the benefit of U.S. Provisional Application No. 61/223,323, "Common Timestamping for Multiple Applications" filed on Jul. 6, 2009, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An apparatus can include multiple subsystems. In an example, an apparatus includes an application subsystem and a communication subsystem. Generally, each subsystem includes its individual time-stamp timer, and uses the individual time-stamp timer to time-stamp events that happen in the subsystem.

SUMMARY

Aspects of the disclosure provide an apparatus for enabling common time-stamping. The apparatus creates a reference to correlate different timers. The apparatus includes a first subsystem having a first timer and a second subsystem having a second timer of a same frequency as the first timer. The first subsystem is configured to time-stamp first events based on the first timer. The second subsystem is configured to time-stamp second events based on the second timer. The apparatus further includes a synchronization module configured to take a first snapshot of the first timer and take a second snapshot of the second timer. Then, based on a difference between the first snapshot and the second snapshot, the first events and the second events are commonly time-stamped.

In an embodiment, the synchronization module is configured to take the first snapshot and the second snapshot at a substantially same instant. In another embodiment, the first timer is configured to operate in response to a first clock that is originated from a system clock and the second timer is configured to operate in response to a second clock that is originated from the same system clock as the first clock. Then, the synchronization module is configured to take the first snapshot at a first instant and take the second snapshot at a second instant. In an embodiment, the first instant differs from the second instant by a known number of clock cycles of the system clock. In another embodiment, the first instant differs from the second instant by a phase within a clock cycle.

According to an aspect of the disclosure, the first timer includes a first counter register configured to increase by one in response to rising edges and/or falling edges of the first clock, and the second timer includes a second counter register configured to increase by one in response to rising edges and/or falling edges of the second clock. The synchronization module includes a first snapshot register configured to receive and keep a first number in the first counter register in response to a sync signal, and a second snapshot register configured to receive and keep a second number in the second counter register in response to the sync signal.

Further, the synchronization module includes a latch circuit that is enabled by the sync signal to latch the first number into the first snapshot register when the first counter register is stable, and to latch the second number into the second snapshot register when the second counter register is stable.

In an embodiment, the latch circuit is configured to latch the first number into the first snapshot register in response to a rising edge of the first clock when the first counter register is configured to increase by one in response to the falling edges of the first clock. In another embodiment, the latch circuit is configured to latch the first number into the first snapshot register in response to a falling edge of the first clock when the first counter register is configured to increase by one in response to the rising edges of the first clock.

Similarly, the latch circuit can be configured to latch the second number into the second snapshot register in response to a rising edge of the second clock when the second counter register is configured to increase by one in response to the falling edges of the second clock, or the latch circuit can be configured to latch the second number into the second snapshot register in response to a falling edge of the second clock when the second counter register is configured to increase by one in response to the rising edges of the second clock.

In an embodiment, the latch circuit includes suitable logic to clear the sync signal after latching the first number and the second number.

Aspects of the disclosure can provide a method for common time stamping. The method includes taking a first snapshot of a first timer that is used by a first subsystem to time-stamp first events, and taking a second snapshot of a second timer that is used by a second subsystem to time-stamp second events. The second timer has a substantially same frequency as the first timer. Then, the method includes common time-stamping the first events and the second events based on a difference between the first snapshot and the second snapshot.

In an embodiment, the second snapshot of the second timer is taken at a substantially same time as the first snapshot.

In another embodiment, the method includes taking the first snapshot of the first timer at a first instant, taking the second snapshot of the second timer at a second instant that differs with the first instant by a known number of clock cycles of a system clock that the first timer and the second timer operate based on, and common time-stamping the first events and the second events based on the difference between the first snapshot and the second snapshot, and the known number of clock cycles.

According to an aspect of the disclosure, the method includes receiving a sync signal, and taking the first snapshot and the second snapshot in response to the sync signal. In an embodiment, the method includes latching a first number of the first timer into a first snapshot register when the first timer is stable, and latching a second number of the second timer into a second snapshot register when the second timer is stable. Further, the method includes clearing the sync signal after latching the first number and the second number.

Aspects of the disclosure can also provide a non-transitory computer readable medium storing program instructions for causing a processor to execute operations for common time-stamping. The operations include setting a sync signal to a synchronization module that takes a first snapshot of a first timer, and takes a second snapshot of a second timer in response to the sync signal. The first timer is used by a first subsystem to time-stamp first events, and the second timer is used by a second subsystem to time-stamp second events. Then, the operation includes common time-stamping the first events and the second events based on a difference between the first snapshot and the second snapshot.

In an embodiment, the operations include providing a first selection signal to a first multiplexer to select the first timer from a first plurality of timers of the first subsystem, and providing a second selection signal to a second multiplexer to select the second timer from a second plurality of timers of the second subsystem.

Further, the operations include reading back the sync signal, and calculating the difference between the first snapshot and the second snapshot after the sync signal is cleared. In an embodiment, the first snapshot and the second snapshot are taken at different instants with a known number of clock cycles apart. In an example, the first snapshot and the second snapshot are taken in a same clock cycle with or without phase difference. In another example, the first snapshot is taken in a clock cycle, the second snapshot is taken in a next clock cycle. The operations include common time-stamping the first events and the second events based on a difference between the first snapshot and the second snapshot, and the known time difference for taking the first snapshot and the second snapshot.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
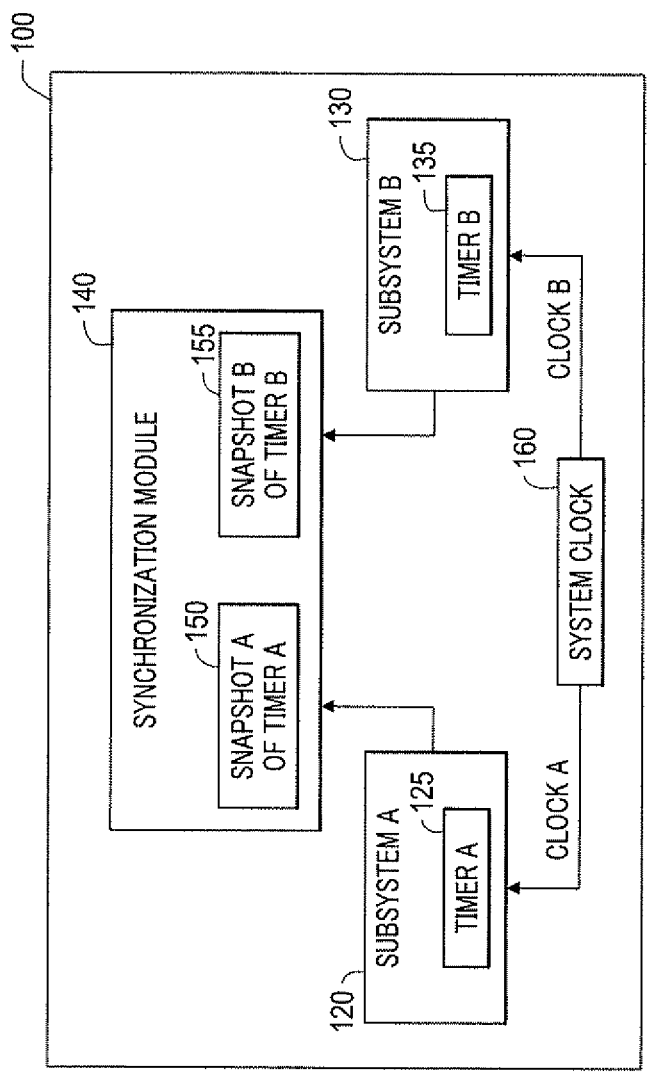
FIG. 1 shows a block diagram of an apparatus example 100 according to an embodiment of the disclosure.

FIG. 1 shows a block diagram of an apparatus example 100 for enabling common time-stamping according to an embodiment of the disclosure. The apparatus 100 includes multiple subsystems, such as a subsystem A 120, a subsystem B 130, and other subsystems (not shown). In an embodiment, the subsystem A 120 and the subsystem B 130 respectively operate independently or cooperatively. Further, the apparatus 100 includes a synchronization module 140 that is configured to enable common time-stamping of events happened in the subsystem A 120 and the subsystem B 130. These elements are coupled together as shown in FIG. 1.

Generally, each subsystem independently time-stamps events that happen in the subsystem. For example, the subsystem A 120 includes a timer A 125. The subsystem A 120 is configured to time-stamp events that happen in the subsystem A 120 based on the timer A 125. Similarly, the subsystem B 130 includes a timer B 135. The subsystem B 130 is configured to time-stamp events that happen in the subsystem B 130 based on the timer B 135.

The timer A 125 and the timer B 135 operate based on a same clock or operate based on clocks of substantially the same frequency. In an example, the apparatus 100 includes a system clock 160. The system clock 160 is generated in the apparatus 100, or received from an external source. The system clock 160 can be suitably distributed to the subsystem A 120, as seen by a clock A, and can be suitably distributed to the subsystem B 130, as seen by a clock B. The timer A 125 and the timer B 135 operate based on the system clock 160. For example, the timer A 125 increases by one in response to rising edges of the clock A, and the timer B 135 increases by one in response to rising edges of the clock B.

However, the timer A 125 and the timer B 135 may not necessarily have the same value. In an embodiment, the subsystem A 120 is configured as an application subsystem, and the subsystem B 130 is configured as a communication subsystem. For example, when the apparatus 100 boots up, the subsystem A 120, which is the application subsystem, boots up first. When the subsystem A 120 boots up, the timer A 125 starts running. The subsystem A 120 performs various initialization procedures, and then starts up the subsystem B 130. When the subsystem B 130 boots up, the timer B 135 starts running. Thus, the timer A 125 and the timer B 135 start running at different times resulting in timing events differently for the subsystem A 120 and the subsystem B 130.

Additionally, a timer difference between the timer A 125 and the timer B 135 is not certain and is not uniformly identical under all circumstances. For example, the initialization procedures vary from one operating system to another operating system. Thus, the timer difference can be different for different operating systems, such as Linux, Windows CE, and the like. In another example, a software executed by the subsystem A 120 that triggers the subsystem B 130 to start running is updated twice a week, for example. The updates also vary the time to trigger the subsystem B 130. Thus, the timer different between the timer A 125 and the timer B 135 varies over time.

The synchronization module 140 includes snapshots of the timers used by the multiple subsystems to time-stamp events. For example, the synchronization module 140 includes a snapshot A 150, and a snapshot B 155. The snapshot A 150 is a snapshot of the timer A 125, and the snapshot B 155 is a snapshot of the timer B 135.

In an embodiment, the snapshot A 150 and the snapshot B 155 are taken at substantially the same time, such as a time that both the timer A 125 and the timer B 135 are stable. In an example, the clock A and the clock B have substantially the same phase. When the timer A 125 increases by one at each rising edge of the clock A, and the timer B 135 increases by one at each rising edge of the clock B, the timer A 125 and the timer B 135 are stable at the falling edges of the clock A and the clock B. The snapshot A 150 and the snapshot B 155 can be taken at substantially the same time at a falling edge of the clock A and B.

In another embodiment, the snapshot A 150 and the snapshot B 155 are taken at different times, but with regard to a same edge of the system clock 160. In an example, the clock A and the clock B have different phases due to distribution delay variation, for example. The timer A 125 increases by one at each rising edge of the clock A, and the timer B 135 increases by one at each rising edge of the clock B. In the embodiment, the snapshot A 150 is taken at a falling edge of the clock A that corresponds to an edge of the system clock 160, and the snapshot B 155 is taken at a falling edge of the clock B that corresponds to the same edge of the system clock 160. The falling edge of the clock A and the falling edge of the clock B may have different phases but they correspond to the same edge of the system clock 160.

In another embodiment, the snapshot A 150 and the snapshot B 155 are taken at different times, and correspond to different edges of the system clock 160. The difference in edges is known. In an example, the clock A and the clock B have different phases. The timer A 125 increases by one at each rising edge of the clock A, and the timer B 135 increases by one at each rising edge of the clock B. In the embodiment, the snapshot A 150 is taken at a falling edge of the clock A that corresponds to a first edge of the system clock 160, and the snapshot B 155 is taken at a falling edge of the clock B that corresponds to a second edge of the system clock 160. The falling edge of the clock A and the falling edge of the clock B have different phases, and correspond to different edges of the system clock 160. As long as the relationship of the first edge and the second edge of the system clock 160 is known, the snapshot A 150 and the snapshot B 155 can be used to enable common time-stamping. For example, the first edge is a rising edge of the system clock 160, and the second edge is a next rising edge of the system clock 160. Thus, the time difference for taking the snapshot A 150 and the snapshot B 155 is one clock cycle of the system clock 160.

Based on the snapshot A 150 and the snapshot B 155, events happening in the subsystem A 120 and the in the subsystem B 130 can be commonly time-stamped with a relatively high resolution. In an example, the subsystem A 120 executes a first plurality of events while the subsystem B 130 executes a second plurality of events. The first plurality of events and the second plurality of events may interact with each other, and affect each other. When something is wrong, a debugging process is started. To debug, for example, the subsystem A 120 provides to a debugger (not shown) a first log file including the first plurality of events that are time-stamped based on the first timer 125, and the subsystem B 130 provides to the debugger, a second log file including the second plurality of events time-stamped based on the second timer 135. It is noted that the debugger can be any suitable debugging authority, such as a debugging software module executed by a processor, a debugging hardware module embedded or plugged in the apparatus 100, a person, and the like.

Further, the debugger suitably obtains a timer difference between the timer A 125 and the timer B 135 based on a value difference between the snapshot A 150 and the snapshot B 155. In an embodiment, the snapshot A 150 and the snapshot B 155 are taken at substantially same instant, or at different instants but corresponding to a same edge of the system clock 160, the synchronization module 140 calculates a difference between the snapshot A 150 and the snapshot B 155. The debugger uses the difference between the snapshot A 150 and the snapshot B 155 to adjust the time-stamps of the first plurality of events and/or the second plurality of events to compensate for the timer difference between the timer A 125 and the timer B 135.

In another embodiment, the snapshot A 150 and the snapshot B 155 are taken at different instants corresponding to different edges of the system clock 160. The different instants are apart by a known number of clock cycles, for example. The synchronization module 140 calculates a value difference between the snapshot A 150 and the snapshot B 155, and combines the known number of clock cycles as the timer difference between the timer A 120 and the timer B 130. For example, when snapshot A 150 is larger than the snapshot B 155 by 51, and the snapshot A 150 is taken one clock cycle earlier than the snapshot B 155, the timer difference of the timer A 125 and the timer B 135 is 52. Based on the timer difference between the timer A 125 and the timer B 135, the debugger commonly time-stamps the first plurality of events and the second plurality of events. Then, based on the commonly time-stamped events, the debugger may identify interaction related errors.

In an example, when the system clock 160 has 32 KHz frequency, the resolution of the common time-stamping is in the order of 30 μs.

It is noted that the calculation of the timer difference between the timer A 120 and the timer B 130 can be performed by any suitable calculation source that is internal or external to the apparatus 100 as long as the calculation source has access to the snapshot A 150 and the snapshot B 155, and knows the number of clock cycles between the instants for taking the snapshots.

In an embodiment, the apparatus 100 includes a single integrated circuit chip that integrates the subsystem A, the subsystem B and the synchronization module 140 together. In another embodiment, the subsystem A 120 is integrated on a first chip, and the subsystem B 130 is integrated on a second chip. The synchronization module 140 can be suitably integrated in the first chip, in the second chip, or can be external to the first chip and the second chip.

Figure 2:
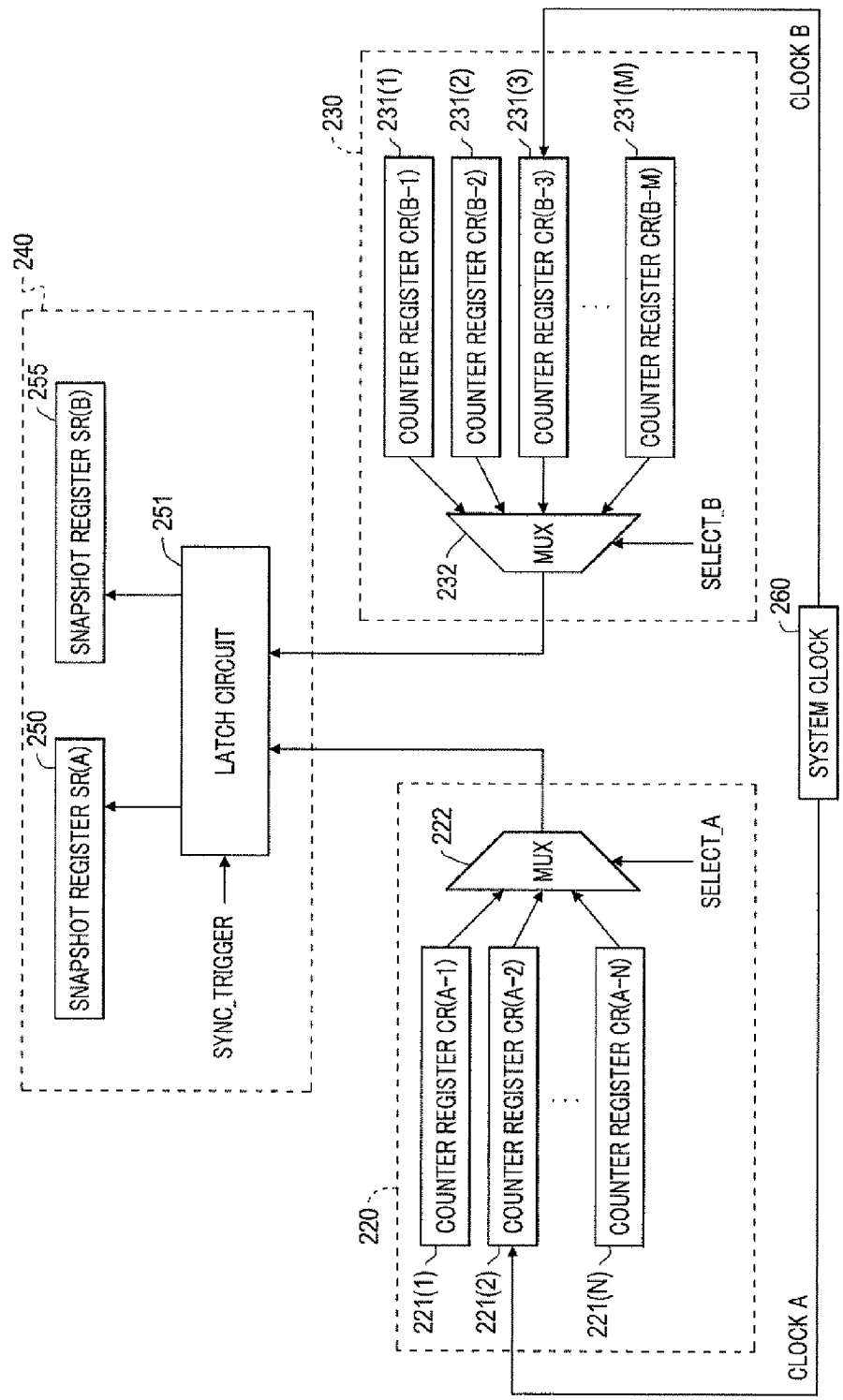
FIG. 2 shows a block diagram of a synchronization module example 240 coupled with two subsystems examples 220 and 230 according to an embodiment of the disclosure.

FIG. 2 shows a block diagram example of a synchronization module 240 coupled with a subsystem A 220 and a subsystem B 230 according to an embodiment of the disclosure. The synchronization module 240 includes a latch circuit 251, a snapshot register SR(A) 250, and a snapshot register SR(B) 255. The subsystem A 220 includes a plurality of counter registers CR(A-1 to A-N) 221(1-N), and a first multiplexer MUX 222. The subsystem B 230 includes a plurality of counter registers CR(B-1 to B-M) 231(1-M), and a second multiplexer MUX 232. These elements are coupled together as shown in FIG. 2.

In an embodiment, CR(A-1 to A-N) 221(1-N) are 32-bit registers that can be individually configured as timers. It is noted that each of CR(A-1 to A-N) 221(1-N) may have individual features that are different from each other. One of CR(A-1 to A-N) 221(1-N) is configured as a time-stamp timer for the subsystem A 220. In an embodiment, different operating systems may choose a different counter register from CR(A-1 to A-N) 221(1-N) as the time-stamp timer. The time-stamp timer is started when the subsystem A boots up, and continues running until the subsystem A is shut down. In the FIG. 2 example, CR(A-2) 221(2) is configured as the time-stamp timer for subsystem A.

The MUX 222 receives a selection signal SELECT_A, selects a counter register from CR(A-1 to A-N) 221(1-N) based on SELECT_A, and outputs the 32-bit of the selected counter register to the synchronization module 240. In an example, SELECT_A is provided from a software module to select the time-stamp timer of the subsystem A, such as CR(A-2) 221(2) in the FIG. 2 example, and the MUX 222 outputs 32-bit timer value of the subsystem A to the synchronization module 240.

Similarly, CR(B-1 to B-M) 231(1-M) are 32-bit registers that can be individually configured as timers. It is noted that each of CR(B-1 to B-M) 231(1-M) may have individual features that are different from each other. One of CR(B-1 to B-M) 231(1-M) is configured as a time-stamp timer for the subsystem B 230. In an embodiment, different operating systems may choose a different counter register from CR(B-1 to B-M) 231(1-M) as the time-stamp timer. The time-stamp timer is started when the subsystem B boots up, and continues running until the subsystem B is shut down. In the FIG. 2 example, CR(B3) 231(3) is configured as the time-stamp timer for subsystem B.

The MUX 232 receives a selection signal SELECT_B, selects a counter register from CR(B-1 to B-M) 231(1-M) based on SELECT_B, and outputs the 32-bit of the selected counter register to the synchronization module 240. In an example, SELECT_B is provided from a software module to select the time-stamp timer of the subsystem B, such as CR(B3) 231(3) in the FIG. 2 example, and the MUX 232 outputs 32-bit timer value of the subsystem B to the synchronization module 240.

In an embodiment, the time-stamp timers of the subsystem A 220 and the subsystem B 230 operate based on a same clock. In the FIG. 2 example, a system clock 260 is suitably distributed to the subsystem A 220, as seen by a clock A, and is suitably distributed to the subsystem B 230, as seen by a clock B. The counter register CR(A-2) 221(2), which is configured as the time-stamp timer of the subsystem A 220, operates in response to the clock A. For example, the counter register CR(A-2) 221(2) increases by one at every rising edge of the clock A. Similarly, the counter register CR(B-3) 231 (3), which is configured as the time-stamp timer of the subsystem B 230, operates based on the clock B. For example, the counter register CR(B-3) 231(3) increases by one in response to every rising edge of the clock B.

The synchronization module 240 receives a first 32-bit timer value from the subsystem A 220 and a second 32-bit timer value from the subsystem B 230, suitably takes snapshots of the received timer values, and store the snapshots in the snapshot registers SR(A) 250 and the SR(B) 255. In an embodiment, the synchronization module 240 takes the snapshots based on a trigger signal SYNC_TRIGGER. For example, when SYNC_TRIGGER is set, such as logic "1", the latch circuit 215 is enabled to direct the received timer values into the snapshot registers SR(A) 250 and the SR(B) 255. When SYNC_TRIGGER is cleared, such as logic "0", the latch circuit 215 is disabled, and the snapshot registers SR(A) and SR(B) keep the last received timer values. In an embodiment, SYNC_TRIGGER is set by a software module, and is cleared by hardware after the timer values have been stored in the snapshot registers SR(A) 250 and SR(B) 255.

In an embodiment, the synchronization module 240 includes any suitable circuit to calculate a difference of the snapshot register SR(A) and snapshot register SR(B). The difference can be suitably stored and used to commonly time-stamp events happened in the subsystem A 220 and the subsystem B 230.

During operation, for example, a software module determines which counter register in the subsystem A 220 is used as the time-stamp timer for the subsystem A 220, and provides SELECT_A to control the MUX 222 to select the determined counter register. Similarly, the software module determines which counter register in the subsystem B 230 is used as the time-stamp register for the subsystem B 230, and provides SELECT_B to control the MUX_232 to select the determined counter register. Further, the software module sets SYNC_TRIGGER, such that the latch circuit 251 is enabled to direct timer values output from the MUX 222 and MUX 232 to the snapshot register SR(A) 250 and the snapshot register SR(B) 255. When the snapshot registers SR(A) 250 and SR(B) 260 successfully store the timer values, SYNC_TRIGGER is cleared, for example by suitable hardware in the synchronization module 240. Then, the snapshot register SR(A) 250 and the snapshot register SR(B) 255 keep the last received timer values as snapshots of the timers of the subsystem A 220 and the subsystem B 230.

Figure 3A:
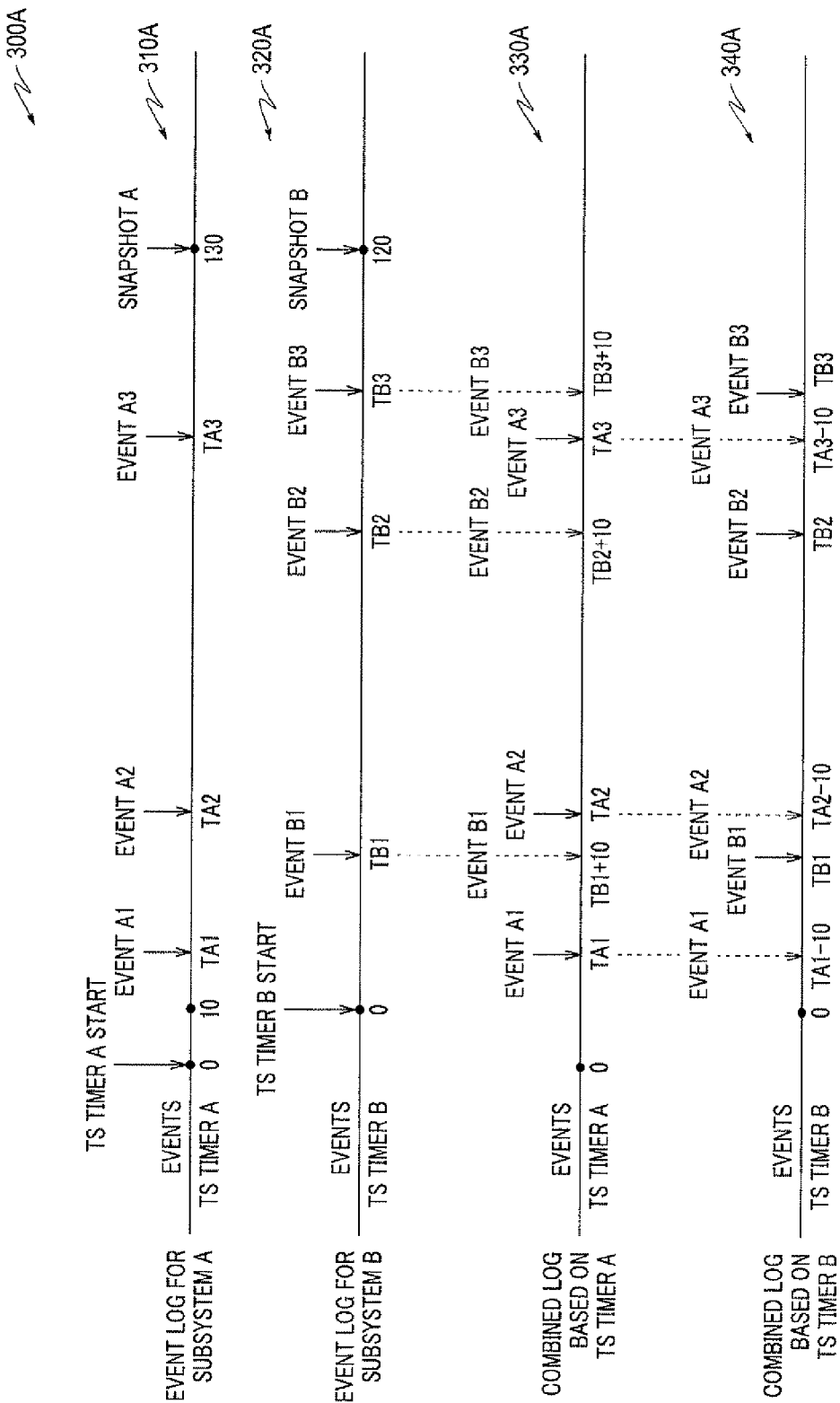
FIGS. 3A and 3B show plots of common time-stamping examples according to an embodiment of the disclosure.

FIG. 3A shows a plot 300A of a common time-stamping example according to an embodiment of the disclosure. The plot 300A shows a first event log 310A for a subsystem A, a second event log 320A for a subsystem B, a first combined log 330A, and a second combined log 340A. The first event log 310A includes a first plurality of events A1-A3 that are time-stamped based on a time-stamp timer of the subsystem A, as seen by TS TIMER A. The second event log 320A includes a second plurality of events B1-B3 that are time-stamped based on a time-stamp timer of the subsystem B, as seen by TS TIMER B. The TS TIMER A and TS TIMER B start at different time. In the FIG. 3A example, the TS TIMER B starts 10 cycles later than the TS TIMER A. Also seen in FIG. 3A, snapshots are taken for TS TIMER A and TS TIMER B, at a substantially same instant, for example. A value difference of the snapshots (e.g., 130 and 120) is calculated.

The first combined log 330A is based on TS TIMER A. The first plurality of events A1-A3 have the same time-stamps as in the first event log 310A, and time-stamps of the second plurality of events B1-B3 are offset from their time-stamps in the second event log 320A based on the value difference of the snapshots, for example, +10, in FIG. 3A.

The second combined log 340A is based on TS TIMER B. The second plurality of events B1-B3 have the same time-stamps as in the second event log 320A, and time-stamps of the first plurality of events A1-A3 are offset from their time-stamps in the first event log 310A based on the value difference of the snapshots, for example, −10, in FIG. 3A.

It is noted that the first event log 310A and the second event log 320A can be suitably combined based on time scales other than TS TIMER A and TS TIMER B.

Figure 3B:
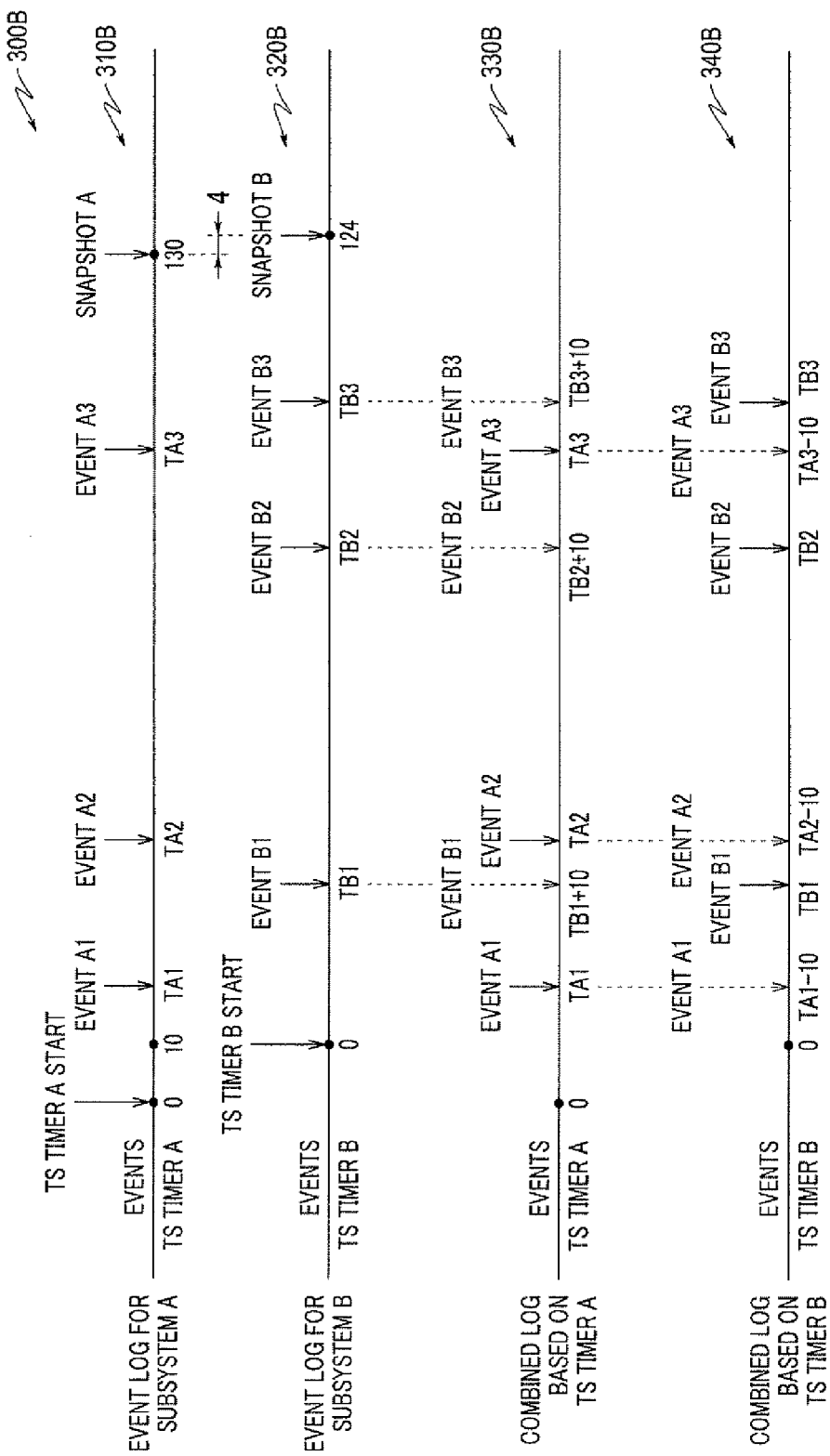

FIG. 3B shows a plot 300B of another common time-stamping example according to an embodiment of the disclosure. The plot 300B shows a first event log 310B for a subsystem A, a second event log 320B for a subsystem B, a first combined log 330B, and a second combined log 340B. The logs 310B-340B are similar to the logs 310A-340A in FIG. 3A; the description of these logs has been provided above and will be omitted here for clarity purposes. In FIG. 3B, snapshots are taken for TS TIMER A and TS TIMER B, at different instants, but with a known time difference apart, such as 4 as seen in FIG. 3B. A value difference of the snapshots (e.g., 130 and 124) is calculated. The timer difference is calculated by combining the value difference of the snapshots (e.g., 6 in FIG. 3B), and the known time difference for taking the snapshots (e.g., 4 in FIG. 3B).

The first combined log 330B and the second combined log 340B are generated based on the timer difference, which is 10 in FIG. 3B, in the similar manner as the example in FIG. 3A.

Figure 4:
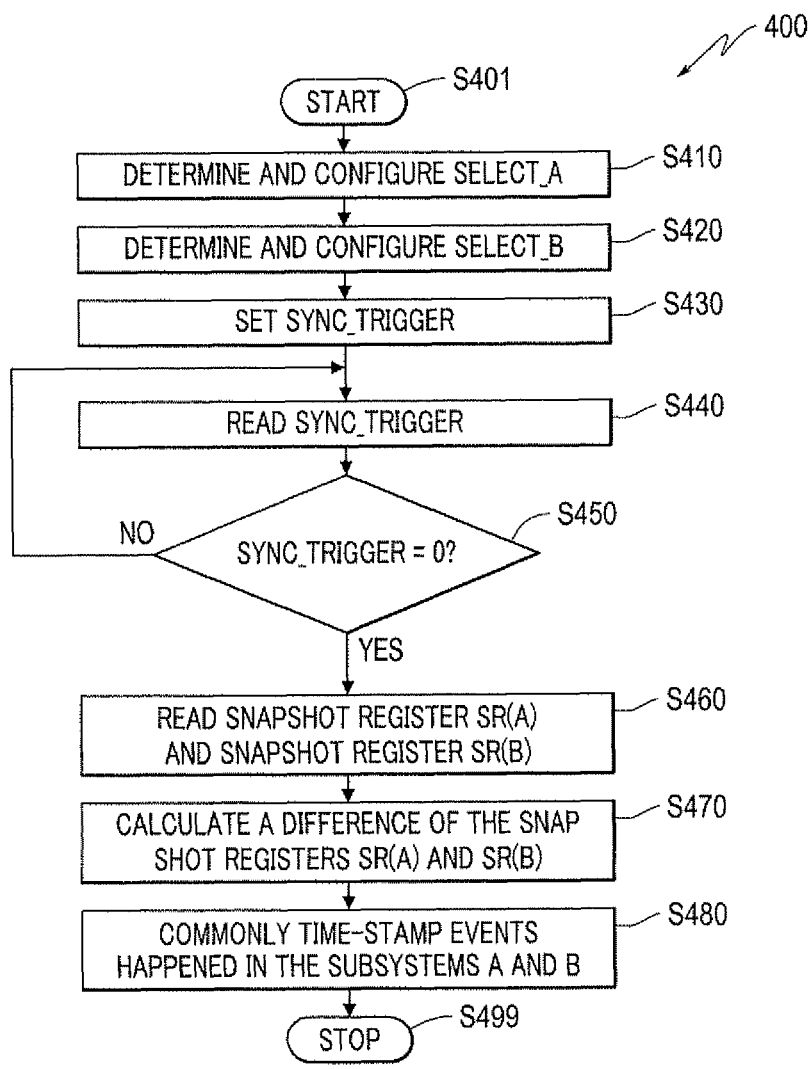
FIG. 4 shows a flowchart outlining a process example 400 for commonly time-stamping events happened in two subsystems according to an embodiment of the disclosure.

FIG. 4 shows a flowchart outlining a process example 400 for commonly time-stamping events happened in the two subsystems 220 and 230 in FIG. 2 according to an embodiment of the disclosure. In an example, the process 400 is executed by a processor according to software instructions stored, for example, in a non-transitory computer readable medium. The process starts at S401, and proceeds to S410.

At S410, the processor suitably determines and configures the selection signal SELECT_A, to select the time-stamp timer used by the subsystem A 220 to time-stamp events happened in the subsystem A 220. In the FIG. 2 example, the subsystem A 220 includes a plurality of counter registers CR(A-1 to A-N) that can be independently configured to be the time-stamp timer for the subsystem A 220. Different operating system may use different counter register as the time-stamp timer, for example. The processor suitably determines which counter register is used as the time-stamp timer, and configures SELECT_A to control the MIA 222 to select the determined counter register for taking a snapshot.

At S420, the processor suitably determines and configures the selection signal SELECT_B, to select the time-stamp timer used by the subsystem B 230 to time-stamp events happened in the subsystem B 230. In the FIG. 2 example, the subsystem B 230 includes a plurality of counter registers CR(B-1 to B-M) that can be independently configured to be the time-stamp timer for the subsystem B 230. Different operating system may use different counter register as the time-stamp timer, for example. The processor suitably determines which counter register is used as the time-stamp timer, and configures SELECT_B to control the MUX 232 to select the determined counter register for taking a snapshot.

At S430, the processor sets the trigger signal SYNC_TRIGGER that results in taking snapshots of the selected counter registers of the subsystem A 220 and the subsystem B 230. In an embodiment, the SYNC_TRIGGER enables a latch circuit. When the latch circuit is enabled, the latch circuit is suitably configured to direct the value in the selected counter register of the subsystem A 220 into the snapshot register SR(A) 250, and direct the value in the selected counter register of the subsystem B 230 into the snapshot register SR(B) 255.

At S440, the processor reads the trigger signal SYNC_TRIGGER. In an embodiment, when the snapshot registers SR(A) 250 and SR(B) 255 successfully store the provided values of the selected counter registers, suitable hardware in the synchronization module 240 clears SYNC_T-TRIGGER to disable the latch circuit. Then, the snapshot register SR(A) 250 and SR(B) 255 do not change with further changes in the selected counter registers, and thus the present values of the selected counter registers are kept in the snapshot registers SR(A) 250 and SR(B) 255.

At S450, the processor determines whether SYNC_TRIGGER has been cleared. When SYNC_TRIGGER is cleared, the snapshots are successfully taken, the process proceeds to S460; otherwise, the processor returns to S440 to continue reading SYNC_TRIGGER.

At S460, the processor reads the snapshot register SR(A) 250 and the snapshot register SR(B) 255.

At S470, the processor calculates a value difference between the snapshot register SR(A) 250 and the snapshot register SR(B) 255.

At S480, the processor commonly time-stamps the events happened in the subsystem A 220 and subsystem B 230 based on the value difference of the snapshot registers SR(A) 250 and SR(B) 255. It is noted the processor can commonly time-stamp the events based on the time-stamp timer of the subsystem A 220 or the time-stamp timer of the subsystem B. In addition, in an embodiment, the process can commonly time-stamp events that happen in the subsystem A 220 and the subsystem B 230 based on other suitable time-stamp timers.

It is noted that the process 400 may be suitably adjusted. In an example, the synchronization module 240 includes a calculation circuit that calculates a value difference between the snapshot registers SR(A) and SR(B), and stores the value difference in a difference register, for example. The processor can read the difference register instead of executing S460 and S470.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. An apparatus for enabling common time-stamping, comprising:
 a first subsystem having a first timer, the first timer configured to operate in response to a first clock that is originated from a system clock, the first subsystem configured to time-stamp first events based on the first timer;
 a second subsystem having a second timer of a same frequency as the first timer, the second timer configured to operate in response to a second clock that is originated from the same system clock as the first clock, the second subsystem configured to time-stamp second events based on the second timer; and
 a synchronization hardware module configured to take a first snapshot of the first timer and take a second snapshot of the second timer, the first events and the second events being commonly time-stamped based on a calculation of a difference between the first snapshot and the second snapshot.

2. The apparatus of claim 1, wherein
 the synchronization module is configured to take the first snapshot at a first instant and take the second snapshot at a second instant, the first instant differing with the second instant by a known number of clock cycles of the system clock.

3. The apparatus of claim 2, wherein
 the first timer includes a first counter register configured to increase by one in response to rising edges and/or falling edges of the first clock; and
 the second timer includes a second counter register configured to increase by one in response to rising edges and/or falling edges of the second clock.

4. The apparatus of claim 3, wherein the synchronization module further comprises:
 a first snapshot register configured to receive and keep a first number in the first counter register in response to a sync signal; and
 a second snapshot register configured to receive and keep a second number in the second counter register in response to the sync signal.

5. The apparatus of claim 4, wherein the synchronization module further comprises:
 a latch circuit that is enabled by the sync signal to latch the first number into the first snapshot register when the first counter register is stable, and to latch the second number into the second snapshot register when the second counter register is stable.

6. The apparatus of claim 5, wherein the latch circuit is configured:
 to latch the first number into the first snapshot register in response to a rising edge of the first clock when the first counter register is configured to increase by one in response to the falling edges of the first clock; or
 to latch the first number into the first snapshot register in response to a falling edge of the first clock when the first counter register is configured to increase by one in response to the rising edges of the first clock.

7. The apparatus of claim 5, wherein the latch circuit is configured:
 to latch the second number into the second snapshot register in response to a rising edge of the second clock when the second counter register is configured to increase by one in response to the falling edges of the second clock; or
 to latch the second number into the second snapshot register in response to a falling edge of the second clock when the second counter register is configured to increase by one in response to the rising edges of the second clock.

8. The apparatus of claim 5, wherein the latch circuit is configured to clear the sync signal after latching the first number and the second number.

9. The apparatus of claim 2, wherein the first instant and the second instant correspond to a same clock cycle of the system clock.

10. The apparatus of claim 1, wherein the synchronization module is configured to take the first snapshot and the second snapshot at a substantially same time.

11. A method for common time stamping, comprising:
taking a first snapshot of a first timer that is used by a first subsystem to time-stamp first events, the first timer configured to operate in response to a first clock that is originated from a system clock,
taking a second snapshot of a second timer that is used by a second subsystem to time-stamp second events, the second timer configured to operate in response to a second clock that is originated from the same system clock as the first clock, the second timer having a substantially same frequency as the first timer; and
common time-stamping, by a synchronization hardware module, the first events and the second events based on a calculation of a difference between the first snapshot and the second snapshot.

12. The method of claim 11, further comprising:
receiving a sync signal; and
taking the first snapshot and the second snapshot in response to the sync signal.

13. The method of claim 12, further comprising:
latching a first number of the first timer into a first snapshot register when the first timer is stable; and
latching a second number of the second timer into a second snapshot register when the second timer is stable.

14. The method of claim 13, further comprising:
clearing the sync signal after latching the first number and the second number.

15. The method of claim 11, wherein taking the second snapshot of the second timer that is used by the second subsystem to time-stamp the second events further comprises:
taking the second snapshot of the second timer at a substantially same time as the first snapshot.

16. The method of claim 11, further comprising:
taking the first snapshot of the first timer at a first instant;
taking the second snapshot of the second timer at a second instant that differs with the first instant by a known number of clock cycles of the system clock that the first timer and the second timer operate based on; and
common time-stamping the first events and the second events based on the calculation of the difference between the first snapshot and the second snapshot, and the known number of clock cycles.

17. A non-transitory computer readable medium storing program instructions for causing a processor to execute operations for common time-stamping, the operations comprising:
setting a sync signal to a synchronization module that takes a first snapshot of a first timer, and takes a second snapshot of a second timer in response to the sync signal, the first timer configured to operate in response to a first clock that is originated from a system clock, the second timer configured to operate in response to a second clock that is originated from the same system clock as the first clock, the first timer being used by a first subsystem to time-stamp first events, and the second timer being used by a second subsystem to time-stamp second events; and
common time-stamping the first events and the second events based on a calculation of a difference between the first snapshot and the second snapshot.

18. The non-transitory computer readable medium of claim 17, the operations further comprising:
providing a first selection signal to a first multiplexer to select the first timer from a first plurality of timers of the first subsystem; and
providing a second selection signal to a second multiplexer to select the second timer from a second plurality of timers of the second subsystem.

19. The non-transitory computer readable medium of claim 17, the operations further comprising:
reading back the sync signal; and
calculating the difference between the first snapshot and the second snapshot after the sync signal being cleared.

20. The non-transitory computer readable medium of claim 17, the operations further comprising:
common time-stamping the first events and the second events based on the calculation of the difference between the first snapshot and the second snapshot, and a known time difference for taking the first snapshot and the second snapshot.

* * * * *